United States Patent [19]

Akiyama

[11] Patent Number: 4,706,122
[45] Date of Patent: Nov. 10, 1987

[54] SOLID-STATE IMAGING DEVICE COMPATIBLE WITH DIFFERENT TELEVISION SYSTEMS

[75] Inventor: Ikuo Akiyama, Tokyo, Japan
[73] Assignee: NEC Corporation, Tokyo, Japan
[21] Appl. No.: 771,837
[22] Filed: Aug. 30, 1985

[30] Foreign Application Priority Data

Aug. 30, 1984 [JP] Japan .............................. 59-180979
Nov. 16, 1984 [JP] Japan .............................. 59-241751

[51] Int. Cl.$^4$ ............................................ H04N 3/14
[52] U.S. Cl. ............................ 358/213.13; 358/225
[58] Field of Search .......................... 358/212–213, 358/140, 225; 350/420–421

[56] References Cited

U.S. PATENT DOCUMENTS 3,097,262  7/1963  Ehrenhaft .......................... 358/225
4,353,084 10/1982  Herbst et al. ...................... 358/44
4,426,664  1/1984  Nagumo et al. .................... 358/213

Primary Examiner—Gene Z. Rubinson
Assistant Examiner—Stephen Brinich
Attorney, Agent, or Firm—Burns, Doane, Swecker & Mathis

[57] ABSTRACT

A solid state imaging device compatible with first and second television systems having different scanning line numbers and different aspect ratios includes a first imaging area having a number of picture elements corresponding to the scanning line number of the first system and a second sub-area having a number of picture elements corresponding to the difference in scanning line numbers of the two systems. When using the imaging device with the first system, signal charges in the picture elements in the first area are read out in a predetermined period while the signal charges in the sub-area are eliminated in a second predetermined period. When using the imaging device with the second system, a lens imaging device converts the aspect ratio of the second system to the aspect ratio of the first system.

4 Claims, 5 Drawing Figures

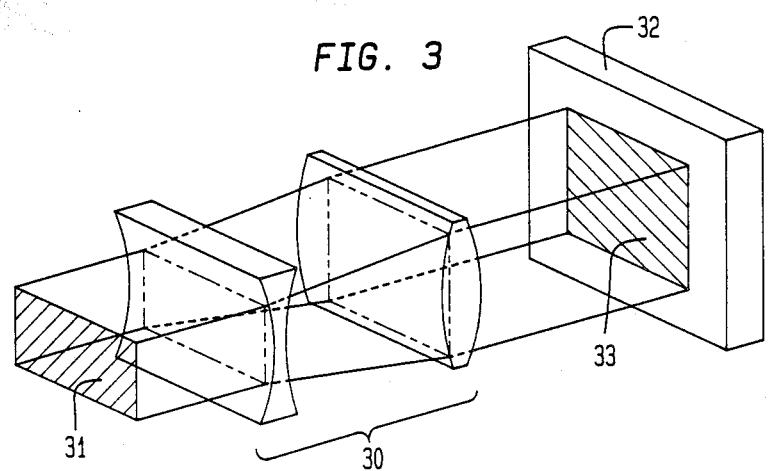
FIG. 3
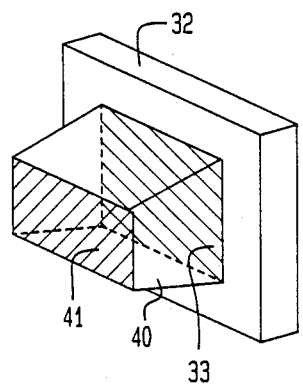
FIG. 4
FIG. 5
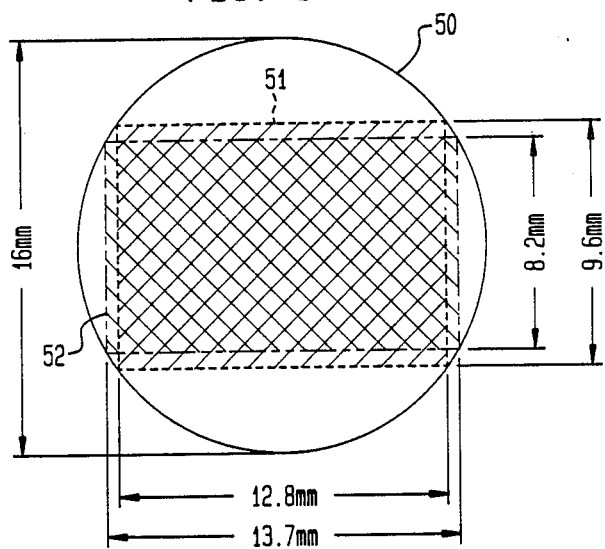

SOLID-STATE IMAGING DEVICE COMPATIBLE WITH DIFFERENT TELEVISION SYSTEMS

BACKGROUND OF THE INVENTION

This invention relates to a solid-state imaging device, and more particularly to a compatible solid-state imaging device which can produce a selected one of television signals according to different television systems.

Recently, there has been a wide interest in a high-definition television system. A high-definition television system makes it possible to transmit a high-precision picture and to apply a television technique to printing and film production fields in which a higher-precision and higher-quality are required.

There have been proposed various systems as the high-definition television system. Among them, two typical systems are an NHK system proposed by the Japan Broadcasting Corporation (NHK) in which a scanning line number is selected of 1125 and an aspect ratio of 5:3 in consideration of visual characteristic and psychological effect (IEEE Transactions On Broadcasting, Vol. BC-26, No. 4 December 1980, pp 113-124), and a European system in which a scanning line number is selected of 1049 (or 1249) and an aspect ratio of 4:3 in consideration of a compatibility with the current standard television system (The Bell System Technical Journal, 62(1983), pp 2091-2111).

In the case where a television camera for such a high-definition television system includes of a solid-state imaging device, the following problem appears. Since an imaging area becomes longer in a horizontal direction, the area utilization ratio on the imaging area of the imaging device is lowered and fine processing in semiconductor manufacturing becomes difficult. It is difficult to provide a solid-state imaging device compatible with different television systems.

OBJECTS AND SUMMARY OF THE INVENTION

It is, therefore, an object of this invention to provide a solid-state imaging device compatible with different television systems in which the area utilization ratio is high and fine processing in a semiconductor manufacturing is easy.

In accordance with the present invention, this object is met by a solid state imaging device that is compatible with first and second television systems having different scanning line numbers and different aspect ratios. The imaging device includes a first imaging area having a number of picture elements corresponding to the scanning line number of the first system and a second sub-area having a number of picture elements corresponding to the difference in scanning line numbers of the two systems. When using the imaging device with the first system, signal charges in the picture elements in the first area are read out in a predetermined period while the signal charges in the sub-area are eliminated in a second predetermined period. When using the imaging device with the second system, a lens imaging device converts the aspect ratio of the first system.

Other features and advantages of this invention will be apparent from the following detailed description of an embodiment of this invention taken in conjunction with the accompanying drawings, wherein:

BRIEF DESCRIPTION OF THE DRAWINGS

FIGS. 3 and 4 show examples of optical converting means to be used when applied with a second television system; and FIG. 5 shows a relationship between an optical format of a lens system and an imaging area of the imaging device.

DETAILED DESCRIPTION

As shown in FIG. 5, a usable area on the imaging device is determined by a diameter of a lens system to be provided in front of imaging device. For example, when an optical format of 1-inch system is used in the lens system, the usable area 50 is circular and has a diameter of 16 mm. An imaging area of the imaging device is selected to have the maximum area in the usable area 50. In the case of a 4:3 aspect ratio, an imaging area 51 has a width of 12.8 mm and a height of 9.6 mm. In this case, the area utilization ratio is 61%. In contrast, in case of 5:3 aspect ratio. an imaging area 52 has a width of 13.7 mm and a height of 8.2 mm, and the area utilization ratio is lowered to 56%. The lowering in area utilization ratio means that the light focused by the lens system is not effectively used, with a resulting lowering of sensitivity.

On the other hand, in an exposure apparatus, the resolution at the pheriphery of the exposed area is lower. Therefore, in practice, the maximum exposed area is determined in which the resolution is maintained at a predetermined value. Since the maximum exposed area is square, a device having longer width or a longer height is unfavorable to the exposure. It is assumed that the solid-state imaging device having 1280 and 970 picture elements in horizontal and vertical directions, respectively, is manufactured within a 1-inch optical format (having a diameter of 16 mm). In case of 4:3 aspect ratio, each cell has a width of 10 $\mu$m and a height of 9.9 $\mu$m. In case of 5:3 aspect ratio, each cell has a width of 10.7 $\mu$m and a height of 8.5 $\mu$m. The latter is less in a height than the former by 1.4 $\mu$m. This makes a fine processing of the semiconductor during manufacturing very difficult.

In the proposed high-definition television systems of the invention, the scanning line number, the aspect ratio and so on are different for every system. It is easy for an imaging tube to change the scanning line number and the aspect ratio by adjusting the amplitude and the period of a deflecting pulse. However, in a solid-state imaging device, the scanning line number and the aspect ratio are automatically defined by an arrangement of the picture elements. This means that the respective television systems have required individual solid-state imaging devices.

This invention will be described with reference to a solid-state imaging device which is compatible with a first television system having a scanning number of 1049 and an aspect ratio of 4:3 and a second television system having a scanning line number of 1125 and an aspect ratio of 5:3.

Figure 1:
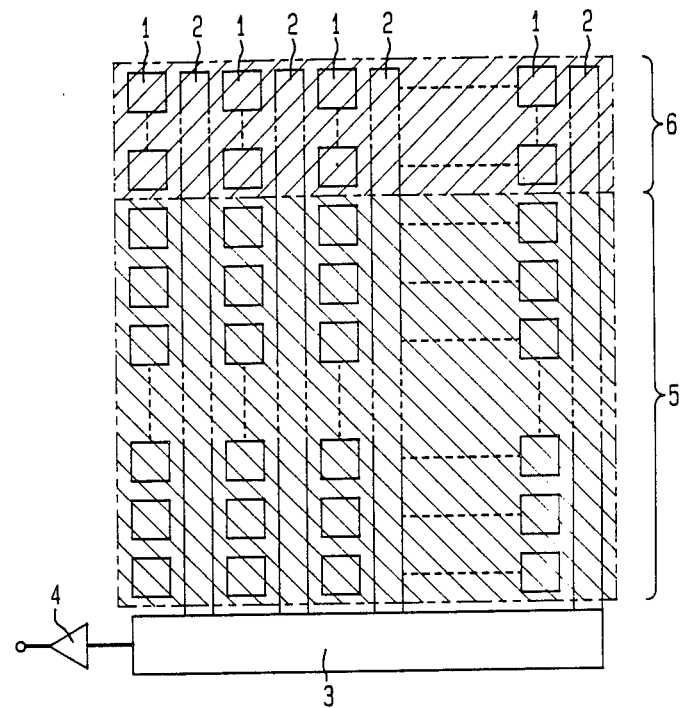
FIG. 1 is a schematic view of a preferred embodiment of this invention.

Referring to FIG. 1, the solid-state imaging device according to the invention is an interline transfer type charge coupled imaging device and comprises photoelectrical conversion elements 1 arrayed in a matrix for accumulating signal charges corresponding to incident light, transfer gates (not shown) for reading out the signal charges accumulated in the photoelectrical conversion elements 1 every vertical scanning period (field or frame), vertical registers 2 for transferring, in the vertical direction, the read out signal charges accumulated during every horizontal scanning period (1H), a horizontal register 3 electrically connected to one end of the vertical registers 2 for transferring the signal charges in the horizontal direction, and an output circuit 4 for converting the signal charges transferred from the horizontal register 3 to electric signals.

A portion including the photoelectrical elements 1, the transfer gates and the vertical register 2 is divided to a main imaging area 5 and a second imaging area 6. The main imaging area 5 has the number of photoelectrical conversion elements 1 in the vertical direction equal to an effective scanning line number of the first television system. Assuming that a vertical blanking period is 79H, the effective scanning line number is 970 (=1049−79), and the number of the elements 1 in the vertical direction in the main imaging area is also 970. The number of the elements 1 in the vertical direction in the sub imaging area 6 is selected to be equal to a difference in the effective scanning line number between the second and first television systems, i.e., to 76 (=(1125−79)−970).

The main and sub imaging areas 5 and 6 are equal in number of the elements 1 in the horizontal direction to each other. The number of the elements 1 in the horizontal direction is determined so that a video signal of a sufficiently wide band is produced. For example, assuming that the first television system has a vertical scanning frequency of 59.94 Hz and an interlaced scanning of 2:1, the horizontal scanning frequency is determined to be:

59.94 Hz×1049÷2=31.44 KHz

Further, assuming that a necessary video signal band width is 20 MHz, a marginal factor in consideration of the response deterioration in a filter to be provided after the imaging device is 1.2, and the rate of the effective horizontal period is 83.8%, the number of the elements 1 in the horizontal direction is obtained by the following equation:

((20 MHz×1.2×2)/31.44 KHz)×83.8%=1280

The size of the imaging device is determined so that the main imaging area 5 has a ratio of width to height equal to the 4:3 aspect ratio and is positioned in the defined optical format. In the case of the 1-inch optical format having a diameter of 16 mm, the main imaging area 5 has the width of 12.8 mm and a height of 9.6 mm. Each cell in the main area 5 has a width of 10 $\mu$m (=12.8 mm÷1280) and a height of 9.9 $\mu$m (=9.6 mm÷970).

The size of each cell in the sub imaging area 6 is determined to be equal to that in the main imaging area 5, whereby the sub imaging area 6 has the width of 12.8 mm and the height of 0.8 mm (=9.9 $\mu$m×76). Therefore, the imaging portion of the main and sub imaging areas 5 and 6 has a shape which has the width of 12.8 mm and the height of 10.4 mm and is closely allied to a square.

Figure 2:
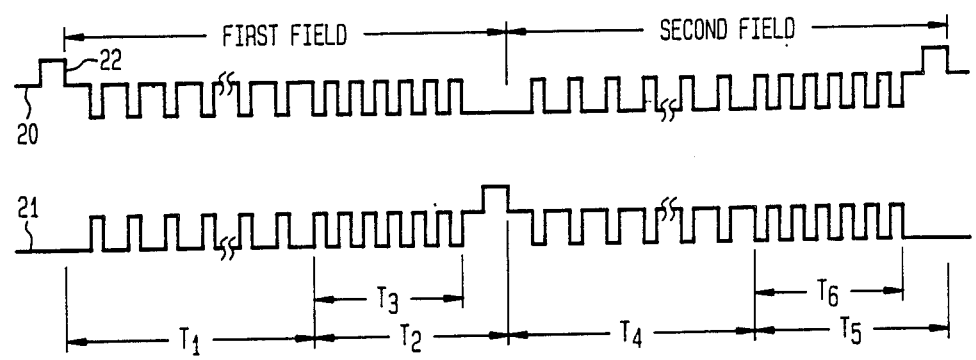
FIG. 2 shows driving pulses to be applied to the embodiment shown in FIG. 1 when applied with a first television system.

An operation of the embodiment will be described with reference to a case where the embodiment is applied with the first television system. An incident optical image is focused in the main imaging area 5. The imaging device is applied with driving pulses 20 and 21 as shown in FIG. 2. Each cell has first and second charge transfer electrodes to which the driving pulses 20 and 21 are respectively applied. In a first field, the signal charges are read out from the elements 1 corresonding to even-numbered scanning lines to the vertical registers 2 in response to a signal reading out pulse 22, and then transferred in the vertical direction to the horizontal register 3 every one horizontal period (1H) in a period $T_1$. The signal charges transferred to the horizontal register 3 are transferred in the horizontal direction and then outputted through the output circuit 4 in one horizontal scanning period. The transferring in the vertical direction is repeated by 485 (=970/2) in the period $T_1$, whereby all the signal charges accumulated in the elements 1 corresponding to the even-numbered scanning lines are read out in the period $T_1$. In a period $T_3$ within a period $T_2$, a high-speed transferring in the vertical direction is repeated by 38 (=76/2), whereby all the signal charges accumulated in the elements 1 corresponding to the even-numbered scanning lines in the sub imaging area 6 can be eliminated as undesired charges. This high-speed transferring makes it possible not to cover the sub imaging area 6 even when the imaging device is applied to the first television system.

In a second field, similarly, the signal charges accumulated in the elements 1 corresponding to the odd-numbered scanning lines in the main imaging area 5 are transferred in the vertical registers 2 and the horizontal register 3 and then outputted from the output circuit 4 as the video signal in a period $T_4$. Further, undesired signal charges accumulated in the elements 1 corresponding to the odd-numbered lines in the sub imaging area 6 are eliminated by the high-speed transferring in the period $T_6$.

As understood from the above description, the solid-state imaging device according to the embodiment can be applied with the first television system by performing the high-speed transferring, ie., by eliminating the signal charges in the sub imaging area 6 within the vertical blanking period.

In case where the solid-state imaging device according to the embodiment is applied with the second television system, all the elements 1 in the imaging portion composed of the main and sub imaging areas 5 and 6 are used for generating the video signal. Since the imaging portion 33 of the imaging device 32 (FIGS. 3 and 4) composed of the main and sub imaging areas 5 and 6 has the width of 12.8 mm and the height of 10.4 mm (aspect ratio is 5:4.06) and the aspect ratio of the second television system is 5:3, it is necessary to provide in front of the imaging device 32 an optical converting means for converting an incident image having a 5:3 aspect ratio to an aspect ratio of 4:4.06.

Referring to FIG. 3, an anamorphic lens system 30 is used as the optical converting means. The anamorphic lens system 30 has a vertical magnification greater than a horizontal magnification by about 1.35 times (=4.06/3). The anamorphic lens system 30 converts the incident image 31 having an aspect ratio of 5:3 to an image having an aspect ratio of 5:4.06. The incident image 31 is expanded in the vertical direction so that it is focused on the whole area of the imaging portion 33.

Referring to FIG. 4, as the optical converting means, a fiber plate 40 is used instead of the anamorphic lens system 30. The fiber plate 40 has a front face 41 having a width of 12.8 mm and a height of 7.7 mm (aspect ratio is 5:3) and a back face 42 having the width of 12.8 mm and a height of 10.4 mm equal in size to the imaging portion 33. The incident image is expanded in the vertical direction as in the anamorphic lens system 30. The fiber plate 40 does not necissitate a longer optical path as compared with the anamorphic lens system 30. This makes it possible to provide a compact small-sized optical system.

Since all the signal charges accumulated in the imaging portion 33 are used as effective signal charges for generating the video signal according to the second television system, it is not necessary to employ the high-speed transferring as in FIG. 2 and a conventional driving method can be employed.

In the above description, the shape of the imaging portion 33 is not completely square. In consideration of the area utilization ratio, the exposing characteristic and the semiconductor manufacturing process, it is desirable to make the shape of the imaging portion completely square.

In case of a square imaging device in which the imaging portion has 1280 and 970 elements 1 in the horizontal and the vertical directions, respectively and the height equal in length to the width (aspect ratio is 1:1), the optical converting means must have a vertical magnification greater than the horizontal magnification by about 1.67 times ($=5/3$), whereby the incident image having the aspect ratio of 5:3 is converted to have the aspect ratio 1:1.

When the square imaging device is applied with the first television system, an incident image having an aspect ratio of 4:3 must be focused to the main imaging area having 970 elements in the vertical direction. Since the main imaging area has the aspect ratio of 1:0.93 ($=4:3.7$), it is necessary to provide in front of the square imaging device an optical converting means having a vertical magnification greater than a horizontal magnification by 1.23 times. In this case, it is noted that the high-speed transferring in the vertical blanking period is employed for generating a video signal according to the first television system.

What is claimed is:

1. A solid-state imaging device compatible with a first television system having a first scanning line number and a first aspect ratio and a second television system having a second scanning line number greater than said first scanning line number and a second aspect ratio different from said first aspect ratio, said device comprising:

a first imaging area, the number of picture elements in a vertical direction in said first imaging area corresponding to said first scanning line number;

a second imaging area provided adjacent to said first imaging area in a vertical direction, the number of picture elements in the vertical direction in said second imaging area corresponding to a difference between said first and second scanning line numbers; and imaging means for converting said second aspect ratio to said first aspect ratio.

2. A solid state imaging device according to claim 1, wherein:

said imaging means has a vertical magnification greater than a horizontal magnification.

3. A solid state imaging device according to claim 2, wherein:

said imaging means includes an anamorphic lens.

4. A solid state imaging device according to claim 2, wherein:

said imaging means includes a fiber plate.

* * * * *